United States Patent
Mitsunobu et al.

(10) Patent No.: US 12,454,748 B2
(45) Date of Patent: Oct. 28, 2025

(54) PLATED STEEL SHEET

(71) Applicant: NIPPON STEEL CORPORATION, Tokyo (JP)

(72) Inventors: Takuya Mitsunobu, Tokyo (JP); Masaaki Uranaka, Tokyo (JP); Kohei Tokuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/874,145

(22) PCT Filed: Jun. 19, 2023

(86) PCT No.: PCT/JP2023/022590
§ 371 (c)(1),
(2) Date: Dec. 12, 2024

(87) PCT Pub. No.: WO2023/248975
PCT Pub. Date: Dec. 28, 2023

(65) Prior Publication Data
US 2025/0163557 A1 May 22, 2025

(30) Foreign Application Priority Data
Jun. 22, 2022 (JP) ................. 2022-100351

(51) Int. Cl.
*C23C 2/06* (2006.01)
*B32B 15/01* (2006.01)
(Continued)

(52) U.S. Cl.
CPC .............. *C23C 2/06* (2013.01); *B32B 15/012* (2013.01); *B32B 15/013* (2013.01); *B32B 15/04* (2013.01);
(Continued)

(58) Field of Classification Search
CPC .. C23C 2/06; C23C 2/40; C23C 30/00; C23C 30/005; C23C 2/02; C23C 2/12;
(Continued)

(56) References Cited

U.S. PATENT DOCUMENTS

2004/0258949 A1 12/2004 Honda et al.
2006/0073355 A1 4/2006 Honda et al.
(Continued)

FOREIGN PATENT DOCUMENTS

JP 2001-355055 A 12/2001
JP 2003-268519 A 9/2003
(Continued)

OTHER PUBLICATIONS

Written Opinion of the International Searching Authority for PCT/JP2023/022632 (PCT/ISA/237) mailed on Aug. 29, 2023.

*Primary Examiner* — Michael E. La Villa
(74) *Attorney, Agent, or Firm* — Birch, Stewart, Kolasch & Birch, LLP

(57) ABSTRACT

This plated steel sheet includes a steel sheet, and a plated layer disposed on a surface of the steel sheet, in which the plated layer has a chemical composition containing, in mass %, Al: 10.0 to 25.0%, Mg: 3.0 to 10.0%, Fe: 0.01 to 2.0%, and Si: more than 0 to 2.0%, with a remainder including Zn and impurities, and a number density of $Mg_2Si$ phases having a major axis of 2 μm or more exposed on the surface of the plated layer is 3 to 150 per area of 10,000 $μm^2$.

9 Claims, 1 Drawing Sheet

(51) Int. Cl.
*B32B 15/04* (2006.01)
*B32B 15/18* (2006.01)
*B32B 15/20* (2006.01)
*C22C 18/00* (2006.01)
*C22C 18/04* (2006.01)
*C23C 2/02* (2006.01)
*C23C 2/12* (2006.01)
*C23C 2/26* (2006.01)
*C23C 2/28* (2006.01)
*C23C 2/40* (2006.01)
*C23C 30/00* (2006.01)

(52) U.S. Cl.
CPC ............ *B32B 15/043* (2013.01); *B32B 15/18* (2013.01); *B32B 15/20* (2013.01); *C22C 18/00* (2013.01); *C22C 18/04* (2013.01); *C23C 2/02* (2013.01); *C23C 2/12* (2013.01); *C23C 2/26* (2013.01); *C23C 2/29* (2022.08); *C23C 2/40* (2013.01); *C23C 30/00* (2013.01); *C23C 30/005* (2013.01); *Y10T 428/12799* (2015.01); *Y10T 428/12951* (2015.01); *Y10T 428/12972* (2015.01); *Y10T 428/12993* (2015.01)

(58) Field of Classification Search
CPC .. C23C 2/29; C23C 2/26; C22C 18/04; C22C 18/00; B32B 15/012; B32B 15/013; B32B 15/04; B32B 15/043; B32B 15/18; B32B 15/20; Y10T 428/12799; Y10T 428/12951; Y10T 428/12972; Y10T 428/12993

See application file for complete search history.

(56) References Cited

U.S. PATENT DOCUMENTS

| | | | |
|---|---|---|---|
| 2014/0127531 A1* | 5/2014 | Yasui | ............... C23C 2/022 428/659 |
| 2018/0051366 A1 | 2/2018 | Ooi et al. | |
| 2019/0390303 A1 | 12/2019 | Tokuda et al. | |
| 2020/0002798 A1 | 1/2020 | Tokuda et al. | |
| 2023/0193443 A1 | 6/2023 | Mitsunobu et al. | |
| 2024/0002991 A1 | 1/2024 | Mitsunobu et al. | |

FOREIGN PATENT DOCUMENTS

| | | |
|---|---|---|
| JP | 2009-120947 A | 6/2009 |
| JP | 2016-166414 A | 9/2016 |
| WO | WO 2004/038060 A1 | 5/2004 |
| WO | WO 2016/140370 A1 | 9/2016 |
| WO | WO 2018/139619 A1 | 8/2018 |
| WO | WO 2018/139620 A1 | 8/2018 |
| WO | WO 2021/171514 A1 | 9/2021 |
| WO | WO 2022/080004 A1 | 4/2022 |

* cited by examiner

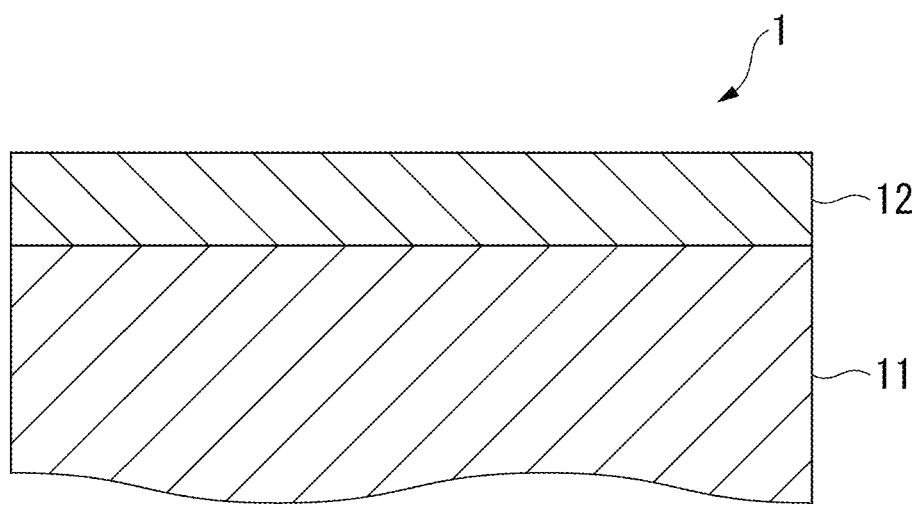

PLATED STEEL SHEET

TECHNICAL FIELD

The present invention relates to a plated steel sheet.

Priority is claimed on Japanese Patent Application No. 2022-100351, filed Jun. 22, 2022, the content of which is incorporated herein by reference.

BACKGROUND ART

A Zn—Al—Mg-based hot-dip plated steel sheet having a hot-dip Zn-plated layer containing Al and Mg has excellent corrosion resistance. Therefore, Zn—Al—Mg-based hot-dip plated steel sheets are widely used, for example, as a material for structural members required to have corrosion resistance, such as building materials.

For example, Patent Document 1 describes a plated steel material including a steel material and a plated layer including a Zn—Al—Mg alloy layer disposed on a surface of the steel material, in which the Zn—Al—Mg alloy layer has a Zn phase and contains a Mg—Sn intermetallic compound phase in the Zn phase, the plated layer includes, in mass %, Zn: more than 65.0%, Al: more than 5.0% to less than 25.0%, Mg: more than 3.0% to less than 12.5%, Sn: 0.1% to 20.0%, and impurities, and has a chemical composition satisfying the following formulas 1 to 5.

$$Bi + In < Sn \quad \text{Formula 1}$$
$$Y + La + Ce \le Ca \quad \text{Formula 2}$$
$$Si < Sn \quad \text{Formula 3}$$
$$0 \le Cr + Ti + Ni + Co + V + Nb + Cu + Mn < 0.25 \quad \text{Formula 4}$$
$$0 \le Sr + Sb + Pb + B < 0.5 \quad \text{Formula 5}$$

Patent Document 2 discloses a plated steel material including a steel material and a plated layer disposed on a surface of the steel material and including a Zn—Al—Mg alloy layer, in which in a cross section of the Zn—Al—Mg alloy layer, an area fraction of a MgZn$_2$ phase is 45 to 75%, an area fraction of a total of the MgZn$_2$ phase and an Al phase is 70% or more, and an area fraction of a Zn—Al—MgZn$_2$ ternary eutectic structure is 0 to 5%, the plated layer includes, in mass %, Zn: more than 44.90% to less than 79.90%, Al: more than 15% to less than 35%, Mg: more than 5% to less than 20%, Ca: 0.1% to less than 3.0%, and impurities, and in a case where an element group A is Y, La, and Ce, an element group B is Cr. Ti, Ni, Co, V, Nb, Cu, and Mn, an element group C is Sr, Sb, and Pb, and an element group D is Sn, Bi, and In, a plated steel material having a chemical composition in which the total amount of elements selected from the element group A is 0% to 0.5%, the total amount of Ca and the elements selected from the element group A is 0.1% to less than 3.0%, the total amount of elements selected from the element group B is 0% to 0.25%, the total amount of elements selected from the element group C is 0% to 0.5%, and the total amount of elements selected from the element group D is 0% to 20.00% is described.

Patent Document 3 describes a hot-dip Al—Zn—Mg—Si plated steel sheet including a plating film on a sheet surface, in which the plating film includes an interface alloy layer present at an interface with a base steel sheet and a main layer present on the alloy layer, the plating film contains 25 to 80 mass % of Al, more than 0.6 to 15 mass % of Si, and more than 0.1 to 25 mass % of Mg, and the area fraction of Mg$_2$Si on the surface of the main layer is 10% or more.

In recent years, hot-dip plated steel materials for building materials used for roofs, wall materials, and the like are required to have both planar corrosion resistance, which is the corrosion resistance of the plated layer itself, and end surface corrosion resistance, which is corrosion resistance of a cut end surface portion. On the other hand, a technique for achieving both planar corrosion resistance and end surface corrosion resistance at a high level has not been studied.

CITATION LIST

Patent Document

Patent Document 1: PCT International Publication No, WO 2018/139619

Patent Document 2: PCT International Publication No. WO 2018/139620

Patent Document 3: Japanese Unexamined Patent Application, First Publication No. 2016-166414

SUMMARY OF INVENTION

Technical Problem

The present invention has been made in view of the above circumstances, and an object of the present invention is to provide a plated steel sheet that is excellent in both planar corrosion resistance and end surface corrosion resistance.

Solution to Problem

In order to solve the above problem, the present invention employs the following configurations.

[1] A plated steel sheet including:
a steel sheet, and a plated layer disposed on a surface of the steel sheet,
in which the plated layer has a chemical composition containing, in mass %,
Al: 10.0 to 25.0%,
Mg: 3.0 to 10.0%,
Fe: 0.01 to 2.0%, and
Si: more than 0 to 2.0%, and
further containing one or more selected from a group consisting of the following group A, group B, and group C,
with a remainder including Zn and impurities, and
a number density of Mg$_2$Si phases having a major axis of 2 μm or more exposed on the surface of the plated layer is 3 to 150 per area of 10,000 μm$^2$,
[Group A] Ni: 0 to 1.0%
[Group B] Ca: 0 to 0.05%
[Group C] 0 to 5% in total of one or more of Sb: 0 to 0.5%, Pb: 0 to 0.5%, Cu: 0 to 1.0%, Sn: 0 to 1.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%

[2] The plated steel sheet according to [1], in which Mg and Si in the chemical composition of the plated layer are Mg: 4.5 to 8 mass % and Si: 0.1 to 2 mass %, and the number density of Mg$_2$Si phases having a major axis of 2 μm or more exposed on the surface of the plated layer is 15 to 150 per area of 10,000 μm$^2$.

[3] The plated steel sheet according to [1], in which
   Al, Mg, and Si in the chemical composition of the plated layer are Al: 15 to 25 mass %, Mg: 4.5 to 8 mass %, and Si: 0.1 to 2 mass %, and
   the number density of $Mg_2Si$ phases having a major axis of 2 μm or more exposed on the surface of the plated layer is 30 to 150 per area of 10,000 μm².

[4] The plated steel sheet according to any one of [1] to [3], in which
   Al, Mg, and Si in the chemical composition of the plated layer are Al: 15 to 25 mass %, Mg: 4.5 to 8 mass %, and Si: 0.1 to 2 mass %, and
   a number density of Mg—Si—Zn—Al phases having a major axis of 2 μm or more exposed on the surface of the plated layer is 5 to 150 per area of 10,000 μm².

[5] The plated steel sheet according to any one of [1] to [3], in which Sn in the chemical composition of the plated layer is Sn: 0.05 to 0.5 mass %, and a $Mg_2Sn$ phase is detected in the plated layer in X-ray diffraction measurement for the plated layer.

[6] The plated steel sheet according to [4], in which Sn in the chemical composition of the plated layer is Sn: 0.05 to 0.5 mass %, and a $Mg_2Sn$ phase is detected in the plated layer in X-ray diffraction measurement for the plated layer.

[7] The plated steel sheet according [1], in which the plated layer has a chemical composition containing the group A in mass %.

[8] The plated steel sheet according to [1], in which the plated layer has a chemical composition containing the group B in mass %.

[9] The plated steel sheet according to [1], in which the plated layer has a chemical composition containing the group C in mass %.

Advantageous Effects of Invention

According to the above aspects of the present invention, it is possible to provide a plated steel sheet that is excellent in both planar corrosion resistance and end surface corrosion resistance.

BRIEF DESCRIPTION OF DRAWINGS

FIG. 1 is a schematic cross-sectional view of the hot-dip plated steel material according to an embodiment of the present invention.

DESCRIPTION OF EMBODIMENTS

By cutting the plated steel sheet, the end surface of the steel sheet is exposed at the cut end surface of the plated steel sheet. The corrosion resistance of the end surface (hereinafter, referred to as end surface corrosion resistance) of the steel sheet is generally achieved as follows. That is, this is achieved by forming a plated layer containing an element having a higher ionization tendency than that of base metal (for example, Zn, Mg, or the like) as a plated layer on the sheet surface, producing a corrosion product by preferentially corroding the plated layer to the base metal, and preventing the end surface of the steel sheet from being corroded by the corrosion product. Therefore, improvement in end surface corrosion resistance by a plated layer and improvement in planar corrosion resistance, which is the corrosion resistance of the plated layer itself, are not compatible.

Therefore, the present inventors have conducted intensive studies in order to improve both the planar corrosion resistance and end surface corrosion resistance of a plated layer containing Al and Mg. The plated layer containing Al, Mg, Si, and Zn may contain a $Mg_2Si$ phase. The $Mg_2Si$ phase contains a relatively large amount of Mg that can contribute to corrosion resistance of the end surface of the steel sheet, but the $Mg_2Si$ phase of the conventional plated steel sheet is often present inside the plated layer, particularly in a region close to an interface with the steel sheet, and the shape thereof is generally massive. Therefore, at the initial stage of corrosion of the plated layer, the $Mg_2Si$ phase was not affected by the corrosion.

However, as a result of intensive studies, the present inventors have succeeded in crystallizing a relatively large amount of needle-shaped $Mg_2Si$ phase on the surface of the plated layer by adjusting the manufacturing conditions of the plated layer. The presence of a large amount of $Mg_2Si$ phase on the surface of the plated layer causes corrosion of the $Mg_2Si$ phase from an initial stage of corrosion of the plated layer. With the corrosion of the $Mg_2Si$ phase, Mg ions are produced as corrosion products, and the Mg ions prevent corrosion of the end surface of the steel sheet. In this way, the end surface corrosion resistance was successfully enhanced.

In addition, since a large amount of $Mg_2Si$ phase is present on the surface of the plated layer, the end surface corrosion resistance due to the corrosion product of the $Mg_2Si$ phase can be improved from the initial stage of corrosion, so that the end surface corrosion resistance can be improved without sacrificing the planar corrosion resistance of the plated layer, thereby achieving both the planar corrosion resistance of the plated layer and the end surface corrosion resistance.

Hereinafter, the plated steel sheet according to an embodiment of the present invention will be described.

A plated steel sheet of the present embodiment includes a steel sheet, and a plated layer disposed on a surface of the steel sheet, in which the plated layer has a chemical composition containing, in mass %, Al: 10.0 to 25.0%, Mg: 3.0 to 10.0%, Fe: 0.01 to 2.0%, and Si: more than 0 to 2.0%, and further containing one or more selected from a group consisting of the following group A, group B, and group C, with a remainder including Zn and impurities, and a number density of $Mg_2Si$ phases having a major axis of 2 μm or more exposed on the surface of the plated layer is 3 to 150 per area of 10,000 μm².

[Group A] Ni: 0 to 1.0%
[Group B] Ca: 0 to 0.05%
[Group C] 0 to 5% in total of one or more of Sb: 0 to 0.5%, Pb: 0 to 0.5%, Cu: 0 to 1.0%, Sn: 0 to 1.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%

In the following description, the expression "%" of the amount of each element in a chemical composition means "mass %". The amount of an element in a chemical composition may be referred to as an element concentration (for example, Zn concentration, Mg concentration, and the like). The "planar corrosion resistance" indicates a property that the plated layer (specifically, Zn—Al—Mg alloy layer) itself is less likely to corrode. The "end surface corrosion resistance" indicates a property of suppressing corrosion of a steel sheet at a steel sheet exposed portion (for example, a cut end surface of a plated steel sheet). The "plated layer" means a plating film produced by the so-called hot-dip plating treatment.

As illustrated in FIG. 1, a plated steel sheet 1 according to the embodiment includes a steel sheet 11. The shape of the steel sheet 11 is not particularly limited. In addition, the steel sheet 11 may be, for example, a base steel sheet formed into a steel pipe, a civil engineering and construction material (fence culvert, corrugated pipe, drain channel lid, splash preventing plate, bolt, wire mesh, guard rail, water stop wall, and the like), a home electric appliance member (a housing of an outdoor unit of an air conditioner, or the like), a vehicle component (a suspension member, or the like), or the like. The forming is, for example, various plastic working methods, such as press, roll forming, and bending.

The material of the steel sheet 11 is not particularly limited. The steel sheet 11 may be, for example, various steel sheets, such as general steel, Al-killed steel, ultra-low carbon steel, high carbon steel, various high tensile strength steels, and some high alloy steels (steels containing a reinforcing element such as Ni, Cr, and the like). The steel sheet 11 may be a hot-rolled steel sheet, a hot-rolled steel strip, a cold-rolled steel sheet, a cold-rolled steel strip, and the like described in JIS G 3302:2010. The method of manufacturing the steel sheet (hot rolling method, pickling method, cold rolling method, etc.), specific manufacturing conditions thereof, and the like are also not particularly limited.

As will be described later, a steel sheet 11 whose surface roughness has been adjusted is used as a steel sheet to be a plated original sheet. The surface roughness of the steel sheet can be adjusted by, for example, a method in which the surface of a rolling roll or a skin pass roll is set to have a predetermined surface roughness, and the surface shape of the roll is transferred at the time of rolling or skin pass.

The plated steel sheet 1 according to the embodiment has a plated layer 12 disposed on a surface of the steel sheet 11. The plated layer 12 of the plated steel sheet 1 according to the present embodiment is mainly composed of a Zn—Al—Mg alloy layer due to the chemical composition described later. In addition, the plated layer 12 of the plated steel sheet 1 according to the present embodiment may include an interfacial alloy layer containing Fe and Al as main components between the steel sheet 11 and the Zn—Al—Mg alloy layer. That is, the plated layer 12 may have a single-layer structure of the Zn—Al—Mg alloy layer or a multi-layer structure including the Zn—Al—Mg alloy layer and the interfacial alloy layer.

The chemical composition of the plated layer according to the present embodiment is composed of Zn and other alloying elements. The chemical composition of the plated layer will be described in detail below. Note that the elements the concentration of which has a lower limit of 0% as described are not essential for solving the problem of the plated steel sheet according to the present embodiment, but are optional elements which are allowed to be included in the plated layer for the purpose of, for example, improving characteristics.

<Al: 10.0 to 25.0%>

Al contributes to improvement in planar corrosion resistance, end surface corrosion resistance, and workability. Therefore, the Al concentration is 10.0% or more. The Al concentration may be 11.0% or more, 12.0% or more, or 15.0% or more. On the other hand, when Al is excessive, the Mg concentration and the Zn concentration relatively decrease, and end surface corrosion resistance is deteriorated. Therefore, the Al concentration is 25.0% or less. The Al concentration may be 24.0% or less, 22.0% or less, or 20.0% or less.

<Mg: 3.0 to 10.0%>

Mg is an element essential for securing planar corrosion resistance and end surface corrosion resistance. Mg is also necessary to crystallize a $Mg_2Si$ phase. Therefore, the Mg concentration is 3.0% or more. The Mg concentration may be 4.0% or more, 5.0% or more, or 6.0% or more. On the other hand, when the Mg concentration is excessive, workability, particularly powdering resistance, may be deteriorated, and planar corrosion resistance may be further deteriorated. Therefore, the Mg concentration is 10.0% or less. The Mg concentration may be 8.0% or less or 7.0% or less.

<Fe: 0.01% to 2.0%>

The Fe concentration may be 0%, but Fe may be contained in the plated layer in an amount of 0.01% or more. It has been confirmed that, when the Fe concentration is 2.0% or less, the performance of the plated layer is not adversely affected. The Fe concentration may be, for example, 0.05% or more, 0.1% or more, 0.5% or more, or 1.0% or more. The Fe concentration is 2.0% or less. The Fe concentration may be 1.8% or less or 1.5% or less. Since Fe may be mixed from the base steel sheet, the Fe concentration may be 0.05% or more.

<Si: more than 0% to 2.0%>

Si contributes to improvement in planar corrosion resistance. Si is also necessary to crystallize a $Mg_2Si$ phase. Therefore, the Si concentration may be more than 0%, 0.01% or more, 0.02% or more, or 0.06% or more. On the other hand, when the Si concentration is excessive, planar corrosion resistance and end surface corrosion resistance deteriorate. Therefore, the Si concentration is 2.0% or less. The Si concentration may be 1.8% or less, 1.6% or less, 1.2% or less, or 1.0% or less.

Further, the plated layer of the embodiment may contain one or more selected from a group consisting of following group A, group B, and group C.

[Group A] Ni: 0 to 1.0%
[Group B] Ca: 0 to 0.05%
[Group C] 0 to 5% in total of one or more of Sb: 0 to 0.5%, Pb: 0 to 0.5%, Cu: 0 to 1.0%, Sn: 0 to 1.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%

<Ni: 0 to 1.0%>

The Ni concentration as Group A may be 0%. On the other hand, Ni contributes to improvement in end surface corrosion resistance. Therefore, the Ni concentration may be 0.05% or more, 0.08% or more, or 0.1% or more. On the other hand, when the Ni concentration is excessive, planar corrosion resistance is deteriorated. Therefore, the Ni concentration is 1.0% or less. The Ni concentration may be 0.8% or less, 0.6% or less, or 0.5% or less.

<Ca: 0% to 0.05%>

The Ca concentration as Group B may be 0%. On the other hand, Ca is an element capable of adjusting the optimum Mg elution amount for imparting planar corrosion resistance. Therefore, the Ca concentration may be 0.005% or more or 0.01% or more. On the other hand, when the Ca concentration is excessive, planar corrosion resistance and workability are deteriorated. Therefore, the Ca concentration is 0.05% or less. The Ca concentration may be 0.04% or less.

Furthermore, the plated layer according to the present embodiment may contain, as Group C, one or two or more elements selected from Sb: 0 to 0.5%, Pb: 0 to 0.5%, Cu: 0 to 1.0%, Sn: 0 to 1.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B:

0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%. The total of these elements is 0 to 5%. If the total exceeds 5%, planar corrosion resistance or end surface corrosion resistance may be reduced.

<Sb, Pb: 0 to 0.5% Each>

The concentration of Sb and Pb may be 0%. On the other hand, Sb and Pb contribute to improvement in end surface corrosion resistance. Therefore, the concentration of each of Sb and Pb may be 0.05% or more, 0.10% or more, or 0.15% or more. On the other hand, when the concentration of Sb and Pb are excessive, planar corrosion resistance is deteriorated. Therefore, the concentration of each of Sb and Pb is 0.5% or less. The concentration of each of Sb and Pb may be 0.4% or less, 0.3% or less, or 0.25% or less.

<Cu, Ti, Cr, Nb, Zr, Mn, Mo, Ag, and Li: 0 to 1.0% Each>

The concentration of each of Cu, Ti, Cr, Nb, Zr, Mn, Mo, Ag, and Li may be 0%. On the other hand, they contribute to improvement in end surface corrosion resistance. Therefore, the concentration of each of Cu, Ti, Cr, Nb, Zr, Mn, Mo, Ag, and Li may be 0.05% or more, 0.08% or more, or 0.10% or more. On the other hand, when the concentration of Cu, Ti, Cr, Nb, Zr, Mn, Mo, Ag, and Li are excessive, planar corrosion resistance is deteriorated. Therefore, the concentration of each of Cu, Ti, Cr, Nb, Zr, Mn, Mo, Ag, and Li is 1.0% or less. The concentration of each of Cu, Ti, Cr, Nb, Zr, Mn, Mo, Ag, and Li may be 0.8% or less, 0.7% or less, or 0.6% or less.

<Sn: 0 to 1.0%>

The Sn concentration may be 0%. On the other hand, Sn is an element that forms an intermetallic compound with Mg and improves the end surface corrosion resistance of the plated layer. Therefore, the Sn concentration may be 0.05% or more, 0.1% or more, or 0.2% or more. However, when the Sn concentration is excessive, planar corrosion resistance is deteriorated. Therefore, the Sn concentration is 1.0% or less. The Sn concentration may be 0.8% or less, 0.6% or less, or 0.5% or less.

<La, Ce, B, Y, P, and Sr: 0 to 0.5% Each>

The concentration of each of La, Ce, B, Y, P, and Sr may be 0%. On the other hand, La, Ce, B, Y, P, and Sr contribute to improvement in end surface corrosion resistance. Therefore, the concentration of each of La, Ce, B, Y, P, and Sr may be 0.10% or more, 0.15% or more, or 0.20% or more. On the other hand, when the concentration of each of La, Ce, B, Y, P, and Sr are excessive, planar corrosion resistance is deteriorated. Therefore, the concentration of each of La, Ce, B, Y, P, and Sr is 0.5% or less. The concentration of each of La, Ce, B. Y, P, and Sr may be 0.4% or less or 0.3% or less.

<Co, Bi, in, V, and W: 0 to 0.5% Each>

The concentration of each of Co, Bi, In, V, and W may be 0%. On the other hand, Co, Bi, In, V, and W contribute to improvement in end surface corrosion resistance. Therefore, the concentration of each of Co, Bi, In, V, and W may be 0.10% or more, 0.15% or more, or 0.20% or more, respectively. On the other hand, when the concentration of each of Co, Bi, In, V, and W is excessive, planar corrosion resistance is deteriorated. Therefore, the concentration of each of Co, Bi, In, V, and W is 0.5% or less. The concentration of each of Co, Bi, In, V, and W may be 0.4% or less or 0.3% or less.

<Remainder: Zn and Impurities>

The remainder in the components of the plated layer according to the embodiment includes Zn and impurities, Zn is an element that brings planar corrosion resistance and end surface corrosion resistance to the plated layer. The impurities refer to a component which is included in a raw material or a component which is mixed in the manufacturing process. For example, in the plated layer, a small amount of components other than Fe may be mixed as the impurity due to mutual atomic diffusion between a base steel sheet and a plating bath.

The chemical compositions of the plated layer are measured by the following method. First, an acid solution in which the plated layer is peeled off and dissolved is obtained using an acid containing an inhibitor that suppresses steel sheet corrosion. Next, the obtained acid solution is subjected to inductively coupled plasma (ICP) analysis. Thereby, the chemical composition of the plated layer can be determined. The type of the acid is not particularly limited as long as the acid can dissolve the plated layer. The chemical composition measured by the above-described means is the average chemical composition of the entire plated layer.

Next, the metallographic structure of the plated layer will be described.

The $Mg_2Si$ phase having a major axis of 2 μm or more is exposed on the surface of the plated layer according to the present embodiment. The number density of the $Mg_2Si$ phases on the surface is 3 to 150 per 10,000 μm$^2$. Since the $Mg_2Si$ phase is exposed on the surface of the plated layer, the $Mg_2Si$ phase is corroded at the initial stage of corrosion of the plated layer to form a corrosion product, and corrosion resistance of the end surface of the steel sheet is improved by the corrosion product. Thereby, the end surface corrosion resistance can be improved without impairing the planar corrosion resistance of the plated layer.

An electron probe microanalyzer (EPMA) is used to identify the $Mg_2Si$ phase on the surface of the plated layer. The surface of the plated layer is observed with a scanning electron microscope attached to EPMA, and the intermetallic compound to be analyzed is identified. Then, the identified intermetallic compound is subjected to elemental analysis to determine whether or not the intermetallic compound is a $Mg_2Si$ phase. In the identification of the $Mg_2Si$ phase, an intermetallic compound containing 55 atom % or more of Mg and 30 atom % or more of Si is defined as the $Mg_2Si$ phase. The $Mg_2Si$ phase may contain Ca, Zn, and Sn in the range of 10 atom % or less in addition to Mg and Si.

The $Mg_2Si$ phase needs to have a shape having a major axis of 2 μm or more, and more preferably has a needle shape having a major axis of 2 μm or more. Furthermore, the $Mg_2Si$ phase more preferably has an aspect ratio of 2 or more. When the $Mg_2Si$ phase has a shape having a major axis of 2 μm or more, the $Mg_2Si$ phase is easily dissolved at the initial stage of corrosion, and more corrosion products can be supplied to the end surface of the steel sheet, so that the end surface corrosion resistance can be enhanced.

The major axis of the $Mg_2Si$ phase is defined as the maximum length of the $Mg_2Si$ phase when the $Mg_2Si$ phase is observed with a scanning electron microscope. The aspect ratio is a ratio of a major axis to a minor axis (major axis/minor axis). The minor axis is defined as a length in a direction orthogonal to the direction of the major axis, and more specifically, a maximum length within a range of ±5° with respect to the direction orthogonal to the major axis direction.

The number density of the $Mg_2Si$ phases on the surface is set to 3 to 150 per 10,000 μm$^2$. When the number density is less than 3 (phases/10,000 μm$^2$), the $Mg_2Si$ phase is too small, and end surface corrosion resistance is insufficient. On the other hand, even when the number density of the $Mg_2Si$ phases exceeds 150 (phases/10,000 μm$^2$), the effect of improving end surface corrosion resistance is saturated, and therefore the upper limit is 150 (phases/10,000 μm$^2$) or less. The number density of the $Mg_2Si$ phases may be 15 or more or 30 or more when the unit is (phases/10,000 $\mu m^2$). Also, the number density of the Mg$_2$Si phases may be 120 or less, 100 or less, 70 or less, 50 or less, or 30 or less.

The number density of the Mg$_2$Si phases on the surface of the plated layer may be affected by the average chemical composition of the plated layer. When Mg and Si in the chemical composition of the plated layer are Mg: 4.5 to 8 mass % and Si: 0.1 to 2 mass %, the number density of the Mg$_2$Si phases having a major axis of 2 $\mu$m or more exposed on the surface of the plated layer may be 15 to 150 per area of 10,000 $\mu m^2$.

In addition, when Al, Mg, and Si in the chemical composition of the plated layer are Al: 15 to 25 mass %, Mg: 4.5 to 8 mass %, and Si: 0.1 to 2 mass %, the number density of the Mg$_2$Si phases having a major axis of 2 $\mu$m or more exposed on the surface of the plated layer may be 30 to 150 per area of 10,000 $\mu m^2$.

Next, the Mg—Si—Zn—Al phase having a major axis of 2 $\mu$m or more may be exposed on the surface of the plated layer according to the present embodiment. The number density of the Mg—Si—Zn—Al phases on the surface is preferably 5 to 150 per 10,000 $\mu m^2$. When the Mg—Si—Zn—Al phase is exposed on the surface of the plated layer, the Mg—Si—Zn—Al phase is corroded at the initial stage of corrosion of the plated layer, thereby forming a dense corrosion product of Mg, Si, Zn, and Al. By forming this corrosion product, planar corrosion resistance of the plated layer is further improved.

An electron probe microanalyzer (EPMA) is used to identify the Mg—Si—Zn—Al phase in the plated layer. The surface of the plated layer is observed with a scanning electron microscope attached to EPMA, and the intermetallic compound to be analyzed is identified. Then, the identified intermetallic compound is subjected to elemental analysis to determine whether or not the intermetallic compound is a Mg—Si—Zn—Al phase. In the identification of the Mg—Si—Zn—Al phase, an intermetallic compound containing Mg: 20 to 45 atom %, Si: 15 to 40 atom %, Zn: 15 to 40 atom %, and Al: 5 to 20 atom % is defined as the Mg—Si—Zn—Al phase.

The number density of the Mg—Si—Zn—Al phases on the surface of the plated layer is affected by the average chemical composition of the plated layer. In order to set the number density of the Mg—Si—Zn—Al phases to 5 to 150 per 10,000 $\mu m^2$, Al, Mg, and Si in the chemical composition of the plated layer are preferably Al: 15 to 25 mass %, Mg: 4.5 to 8 mass %, and Si: 0.1 to 2 mass %.

The Mg—Si—Zn—Al phase preferably has a shape having a major axis of 2 $\mu$m or more, and more preferably has a needle shape having a major axis of 2 $\mu$m or more. Furthermore, the Mg—Si—Zn—Al phase preferably has an aspect ratio of 2 or more. When the Mg$_2$Si phase has a shape having a major axis of 2 $\mu$m or more, the Mg—Si—Zn—Al phase is easily dissolved at the initial stage of corrosion, and more dense corrosion products can be formed, so that planar corrosion resistance can be enhanced.

The major axis of the Mg—Si—Zn—Al phase is defined as the maximum length of the Mg—Si—Zn—Al phase when the Mg—Si—Zn—Al phase is observed with an electron microscope. The aspect ratio is a ratio of a major axis to a minor axis (major axis/minor axis). The minor axis is defined as a length in a direction orthogonal to the direction of the major axis, and more specifically, a maximum length within a range of ±5° with respect to the direction orthogonal to the major axis direction.

The number density of the Mg—Si—Zn—Al phases on the surface is preferably 5 to 150 per 10,000 $\mu m^2$. By setting the number density to 5 (phases/10,000 $\mu m^2$) or more, planar corrosion resistance can be further improved. On the other hand, even when the number density of the Mg—Si—Zn—Al phases exceeds 150 (phases/10,000 $\mu m^2$), the effect of improving planar corrosion resistance is saturated, and therefore the upper limit is 150 (phases/10,000 $\mu m^2$) or less. The number density of the Mg—Si—Zn—Al phases may be 10 or more or 15 or more when the unit is (phases/10,000 $\mu m^2$). Also, the number density of the Mg—Si—Zn—Al phases may be 120 or less, 100 or less, 80 or less, 70 or less, 50 or less, or 30 or less.

The Mg—Si—Zn—Al phase may be present at a number density of more than 0 to less than 5 per area of 10,000 $\mu m^2$ on the surface of the plated layer.

A method for measuring the number density of the Mg$_2$Si phases and the Mg—Si—Zn—Al phases will be described. A 50 $\mu$m square measurement region is provided on the surface of the plated layer. The number of measurement regions is eight, and the eight measurement regions are randomly arranged on the surface of the plated layer. The measurement regions are separated so as not to overlap each other. The intermetallic compound is confirmed by observing the set measurement regions with a scanning electron microscope. Then, the composition of the intermetallic compound is analyzed by EPMA to distinguish between the Mg Si phase and the Mg—Si—Zn—Al phase. Furthermore, the number of each of the Mg$_2$Si phases and the Mg—Si—Zn—Al phases in each measurement region is measured. Measurement conditions of EPMA are, for example, an acceleration voltage of 15 kV, a current of 0.05 $\mu$A, and an irradiation time of 50 ms. As the EPMA, for example, JXA-8230 manufactured by JEOL Ltd. is used.

When the Mg$_2$Si phase and the Mg—Si—Zn—Al phase have a needle shape, a part of the phase may be within the measurement region, and the remainder of the phase may be outside the measurement region, but such a phase is also included in the number to be measured.

In addition, when the Mg$_2$Si phase and the Mg—Si—Zn—Al phase have a needle shape, a plurality of Mg$_2$Si phases or a plurality of Mg—Si—Zn—Al phases may overlap each other. In such a case, when the major axis directions of the respective phases face different directions and overlap with each other, the respective overlapping phases are targeted for the measurement of the number. For example, when two Mg$_2$Si phases overlap each other and the major axis directions thereof are different directions, the number of Mg$_2$Si phases is counted as two.

Then, based on the number of each of the Mg$_2$Si phases having a major axis of 2 $\mu$m or more and the Mg—Si—Zn—Al phases having a major axis of 2 $\mu$m or more measured in the eight measurement regions and the total area of the measurement regions, the number per 10,000 $\mu m^2$ is determined as the number density.

In addition, when 0.05 to 0.5 mass % of Sn is contained in the plated layer, a Mg$_2$Sn phase is preferably contained in the plated layer. Since the amount of the Mg$_2$Sn phase is small, the presence thereof is detected and confirmed by X-ray diffraction measurement. When the plated layer contains the Mg$_2$Sn phase therein, the plated layer has more improved end surface corrosion resistance. Whether or not the Mg$_2$Sn phase is contained in the plated layer is determined by whether or not a diffraction peak specific to Mg$_2$Sn appears. Here, the diffraction peak specific to Mg$_2$Sn refers to a peak at which a diffraction angle 2θ appears at 23.4±0.3 degrees.

The adhesion amount per one surface of the plated layer may be, for example, within a range of 20 to 150 g/m$^2$.

When the adhesion amount per one surface is 20 g/m² or more, planar corrosion resistance and end surface corrosion resistance of the plated steel sheet can be further enhanced. On the other hand, when the adhesion amount per one surface is 150 g/m² or less, the workability of the plated steel sheet can be further improved.

Next, a method for manufacturing a plated steel sheet of the present embodiment will be described, but the method for manufacturing a plated steel sheet according to the present embodiment is not particularly limited. For example, according to the manufacturing conditions described below, the plated steel sheet according to the present embodiment can be obtained.

As for the method for manufacturing a plated steel sheet of the present embodiment, a steel sheet whose surface roughness has been adjusted is annealed in a reducing atmosphere, and the steel sheet immediately after the annealing is immersed in a hot-dip plating bath and then pulled up to form a plated layer on the surface of the steel sheet. Subsequently, cooling is performed by spraying a cooling gas until the temperature of the plated layer reaches 300° C. or lower from the bath temperature. The gas flux when spraying a cooling gas is set such that the gas flux from the bath temperature to the controlled cooling temperature (the gas flow rate in the temperature range higher than or equal to the controlled cooling temperature and equal to or lower than the bath temperature) is set in the range of 100 to 5,000 L/min/m², and the gas flux from the controlled cooling temperature to the cooling stop temperature (in the present embodiment, 300° C. or lower) (the gas flow rate in the temperature range higher than or equal to the cooling stop temperature and equal to or lower than the controlled cooling temperature) is set in the range of 10,000 to 80,000 L/min/m².

The controlled cooling temperature is a temperature within the range of −10° C. to −80° C. with respect to the crystallization temperature of $Mg_2Si$ phase.

For the roughness of the sheet surface to be the plated original sheet, the ratio of curve length $L_p$ of roughness curve per reference length $L_0$ ($L_p/L_0$) is set to 1.0 or more, and the arithmetic mean roughness Ra is set to 0.1 μm or more. When the roughness is out of this range, a large amount of $Mg_2Si$ phase crystallizes near the interface between the plated layer and the steel sheet, and the number density of $Mg_2Si$ phases on the surface of the plated layer may decrease. The upper limit of ($L_p/L_0$) is preferably 3.0 or less, and may be 2.5 or less or 2.0 or less. The upper limit of the arithmetic mean roughness Ra is preferably 4.0 μm or less, and may be 3.5 μm or less. The roughness of the sheet surface is not particularly limited, but may be adjusted by, for example, rolling the plated original sheet with a rolling roll or a roll for temper rolling in which the surface of the roll has been adjusted to a desired roughness to transfer the surface shape of the roll. Alternatively, the roughness may be adjusted by pickling.

($L_p/L_0$) and the arithmetic mean roughness are measured using, for example, a 3D laser microscope (model number: VK-8700) manufactured by KEYENCE CORPORATION. As measurement conditions, for example, measurement is performed under the following conditions: measurement mode: laser confocal, measurement quality: high accuracy, pitch: 0.75 μm, double scan: ON, optical zoom: 1 time, objective lens name: Plan, γ coefficient: 0.45, and offset: 0%. The measuring device used for measuring ($L_p/L_0$) and the arithmetic mean roughness is not limited to the above example. According to JIS B 0601:2013, a roughness curve was obtained by sequentially applying contour curve filters of cut-off values λc and λs to the cross section curve obtained by measurement. Specifically, from the obtained measurement results, a roughness curve was obtained by removing a component with a wavelength λc of 0.001 mm or less and a component with a wavelength λs of 0.2 mm or more. ($L_p/L_0$) and the arithmetic mean roughness were calculated based on the obtained roughness curve.

Annealing of the steel sheet to be a plated original sheet is performed in a reducing atmosphere. The reducing atmosphere and the annealing conditions are not particularly limited. By this annealing, the oxide present on the sheet surface is removed as much as possible.

Subsequently, the steel sheet immediately after annealing is immersed in a hot-dip plating bath. The chemical composition of the hot-dip plating bath may be appropriately adjusted so as to obtain the chemical composition of the plated layer described above. The temperature of the hot-dip plating bath is also not particularly limited. It is possible to appropriately select a temperature at which hot-dip plating can be performed. For example, the plating bath temperature may be higher than the melting point of the plating bath by about 20° C. or more.

Next, the steel sheet is pulled up from the hot-dip plating bath. The adhesion amount of the plated layer can be controlled by controlling the pulling speed of the steel sheet. If necessary, wiping may be performed on the steel sheet to which the plated layer is adhered to control the adhesion amount of the plated layer. The adhesion amount of the plated layer is not particularly limited, and can be, for example, within the above-described range.

Next, the plated layer is cooled. The cooling is performed by spraying a cooling gas on the steel sheet immediately after being pulled up from the hot-dip plating bath. The cooling by spraying a cooling gas is continuously performed until the temperature of the steel sheet reaches 300° C. from the bath temperature. The cooling condition at less than 300° C. is not particularly limited. The cooling of spraying a cooling gas may be subsequently performed, or natural cooling may be performed.

The cooling by spraying a cooling gas is performed by disposing a cooling zone along the conveyance path for the steel sheet. The cooling zone includes a plurality of spraying nozzles for cooling gas. The shape of the gas nozzle from which the cooling gas is blown out is, for example, in the range of a diameter of 1 to 50 mm. The angle formed by the tip of the gas nozzle and the steel sheet is, for example, in the range of 70 to 110°, more preferably 90° (perpendicular). The distance between the tip of the gas nozzle and the steel sheet is in the range of 30 to 1000 mm. The shape, angle, and distance of the gas nozzle are merely examples, and are not limited to the above ranges.

The cooling gas to be sprayed is not particularly limited, and may be a non-oxidizing gas such as nitrogen, an inert gas such as argon, or air, or a mixed gas thereof.

In the present embodiment, a gas flux when spraying a cooling gas is controlled in two stages. That is, on the basis of the temperature of the steel sheet, the gas flux from the plating bath temperature to the controlled cooling temperature (the temperature in the range of −10 to −80° C. with respect to the crystallization temperature of $Mg_2Si$ phase) is set in the range of 100 to 5,000 L/min/m², preferably in the range of 500 to 5,000 L/min/m², and the gas flux from the controlled cooling temperature to 300° C. or lower is set in the range of 10,000 to 80,000 L/min/m². The controlled cooling temperature is a temperature assumed to be the crystallization start temperature of $Mg_2Si$ phase.

When the gas flux is set in the range of 5,000 L/min/m² or less, it is possible to suppress vibration from being applied to the steel sheet being cooled. On the other hand, when the gas flux is set in the range of 10,000 L/min/m² or more, vibration can be applied to the steel sheet being cooled.

Then, by setting the gas flux from the plating bath temperature to the controlled cooling temperature in the range of 100 to 5,000 L/min/m², preferably the range of 500 to 5,000 L/min/m², nucleation of a Si-containing phase other than the Mg$_2$Si phase is promoted without applying vibration to the steel sheet, and Mg and Si are concentrated in the liquid phase in the unsolidified state. Next, by setting the gas flux from the controlled cooling temperature to 300° C. or lower in the range of 10,000 to 80,000 L/min/m², vibration is applied to the surface of the liquid phase in the unsolidified state, and a large amount of Mg$_2$Si phase can be crystallized on the surface of the plated layer. When the range of the gas flux is out of the above range, it is difficult to crystallize a large amount of Mg$_2$Si phase on the surface of the plated layer.

Since the crystallization temperature of Mg$_2$Si phase varies depending on the chemical composition of the plated layer, the crystallization temperature is calculated using a calculation phase diagram. Specifically, the crystallization temperature of Mg$_2$Si phase is determined for each chemical composition of the plated layer by constructing a calculation phase diagram database in which thermodynamic data such as an intermetallic compound phase and a metal phase that can be contained in the Al—Mg—Zn based alloy are integrated, and performing calculation by CALPHAD method (CALculation of PHAse Diagram). More specifically, the crystallization temperature of Mg$_2$Si phase can be estimated by using "Thermo-Calc" ((Thermo-Calc is a registered trademark) manufactured by Thermo-Calc Software) which is a thermodynamic equilibrium calculation software. The thermodynamic equilibrium calculation software used for the calculation is not limited to "Thermo-Calc" (registered trademark), and other software may be used. The temperature within the range of −10 to −80° C. with respect to the obtained crystallization temperature of Mg$_2$Si phase is defined as the controlled cooling temperature.

In the above manufacturing method, nucleation of the Mg$_2$Si phase is suppressed by adjusting the surface roughness of the sheet surface in advance, whereby the crystallization of Mg$_2$Si phase in the vicinity of the interface between the plated layer and the steel sheet is suppressed. By performing hot-dip plating on such a steel sheet and controlling the cooling conditions after plating as described above, a large amount of Mg$_2$Si phase is crystallized on the surface of the plated layer. As a result, it is assumed that a large number of Mg$_2$Si phases having a major axis of 2 μm or more can be formed on the surface of the plated layer.

As long as the requirements shown in the present invention are satisfied, the method for manufacturing a plated steel sheet is not limited to the above contents, and instead of the hot-dip plating method, an electro plating method, a vapor deposition plating method, a thermal spraying method, a cold spraying method, or the like may be adopted.

Examples

Hereinafter, embodiments of the present invention will be described. However, the conditions in Examples are merely one condition example adopted to confirm the operability and effects of the present invention. The present invention is not limited to this one condition example. The present invention can adopt various conditions as long as the object of the present invention is achieved without departing from the gist of the present invention.

A cold-rolled steel sheet (0.05 C-0.1 Si—0.2 Mn) having a sheet thickness of 2.3 mm was used as a plated original sheet. The surface roughness of a part of the plated original sheet was controlled using a skin pass mill or the like. The steel sheet whose surface roughness had been adjusted was annealed. The annealed steel sheet was immersed in various hot-dip plating baths and then pulled up to adhere a plated layer to the sheet surface. Subsequently, various plated steel sheets were manufactured by cooling the plated layer immediately after being pulled up from the plating bath until the temperature of the plated layer reached 300° C. using a cooling gas.

For the surface roughness of the sheet surface to be the plated original sheet, the ratio of curve length $L_p$ of roughness curve per reference length $L_0$ ($L_p/L_0$) was set to 1.1 to 2.7, and the arithmetic mean roughness Ra was set in the range of 0.5 to 3.7 μm.

(L/L$_0$) and the arithmetic mean roughness were measured using a 3D laser microscope (model number: VK-8700) manufactured by KEYENCE CORPORATION. As measurement conditions, measurement was performed under the following conditions: measurement mode: laser confocal, measurement mode: laser confocal, measurement quality: high accuracy, pitch: 0.75 μm, double scan; ON, optical zoom: 1 time, objective lens name: Plan, γ coefficient: 0.45, and offset: 0%.

Annealing conditions when the steel sheet was annealed in a reducing atmosphere were a soaking temperature of 600° C. and a soaking time of 10 seconds. The annealing atmosphere was a reducing atmosphere composed of a mixed gas of 5% hydrogen and remainder nitrogen. Then, the annealed steel sheet was air-cooled with a nitrogen gas, and after the temperature of the immersion sheet reached the bath temperature +20° C., the steel sheet was immersed in a hot-dip plating bath and then pulled up. The pulling speed was set to 20 to 200 mm/sec.

The chemical composition of the plated layer was as shown in Table 1. The manufacturing conditions were as shown in Table 2. Also, the metallographic structure of the plated layer was evaluated, and the results are shown in Table 3. Furthermore, the planar corrosion resistance and end surface corrosion resistance of the plated steel sheet were evaluated, and the results are shown in Table 3.

The chemical composition of the plated layer and the metallographic structure of the plated layer were evaluated by the means described above. The Mg$_2$Si phase having a major axis of 2 μm or more was targeted for measurement. In addition, a Mg—Si—Zn—Al phase having a major axis of 2 μm or more was targeted for measurement. The measured Mg$_2$Si phase and Mg—Si—Zn—Al phase had an aspect ratio of 2 or more.

The planar corrosion resistance was evaluated as follows. The obtained hot-dip plated steel material was cut into 100 mm×50 mm and subjected to an evaluation test of planar corrosion resistance. The planar corrosion resistance was evaluated by the corrosion acceleration test specified in JASO-CCT-M609. After 120 cycles, the corrosion loss was compared. The evaluation criteria were as follows, and "AAA", "AA", and "A" were regarded as acceptable, AAA: Corrosion loss of less than 50 g/m²

AA: Corrosion loss of 50 g/m² or more and less than 90 g/m²

A: Corrosion loss of 90 g/m² or more and less than 120 g/m²

B: Corrosion loss of 120 g/m² or more

The end surface corrosion resistance was evaluated on the basis of the red rust generation state of the cut end surface portion by cutting the plated steel sheet at an arbitrary position to expose the cut end surface and subjecting the cut end surface to a neutral salt spray test defined in JIS Z 2371. The evaluation criteria of the red rust area ratio are shown below. "AAA", "AA", and "A" were regarded as acceptable.

AAA: Red rust area ratio of 10% or less in 2,500 h
AA: Red rust area ratio of 10% or less in 2,000 h
A: Red rust area ratio of 20% or less in 1,500 h
B: Red rust area ratio of more than 20% in 1,500 h As shown in Tables 1 to 3, Examples 1 to 30, and 39 according to the present invention, in which the chemical composition and the metallographic structure of the plated layer were appropriately controlled, were excellent in both planar corrosion resistance and end surface corrosion resistance. In Examples, the adhesion amount per one surface of the plated layer was within a range of 20 to 150 g/m².

Comparative Example 31 had an insufficient Al amount in the plated layer. Therefore, in Comparative Example 31, Si was crystallized not as a $Mg_2Si$ phase but as a Si phase, and planar corrosion resistance was insufficient.

Comparative Example 32 had an excessive Al amount in the plated layer. Therefore, in Comparative Example 32, an Fe—Al—Si-based interface alloy layer was formed at the interface between the plated layer and the steel sheet, and at this time, Si was consumed in the formation of the interface alloy layer, so that the $Mg_2Si$ phase did not crystallize on the surface, and the end surface corrosion resistance was reduced.

Comparative Example 33 had an insufficient Mg amount in the plated layer. Therefore, in Comparative Example 33, Si was crystallized not as a $Mg_2Si$ phase but as a Si phase, and planar corrosion resistance and end surface corrosion resistance were reduced.

Comparative Example 34 had an excessive Mg amount in the plated layer. Therefore, in Comparative Example 34, nucleation of the $Mg_2Si$ phase proceeded inside the plated layer, the $Mg_2Si$ phase did not crystallize on the surface, and planar corrosion resistance was reduced.

Comparative Example 35 had an excessive Si amount in the plated layer. Therefore, in Comparative Example 35, nucleation of the $Mg_2Si$ phase proceeded inside the plated layer, the $Mg_2Si$ phase did not crystallize on the surface, and planar corrosion resistance and end surface corrosion resistance were reduced.

Comparative Example 36 had an excessive Ca amount in the plated layer. Therefore, in Comparative Example 36, a large amount of Ca-containing compound was produced, the $Mg_2Si$ phase did not crystallize, and planar corrosion resistance and end surface corrosion resistance were reduced.

In Comparative Example 37, the cooling gas flux from the bath temperature to the controlled cooling temperature was excessive. Therefore, in Comparative Example 37, nucleation of the $Mg_2Si$ phase proceeded inside the plated layer, the $Mg_2Si$ phase did not crystallize on the surface, and planar corrosion resistance and end surface corrosion resistance were reduced.

In Comparative Example 38, the cooling gas flux from the controlled cooling temperature to 300° C. was insufficient. Therefore, in Comparative Example 38, nucleation of the $Mg_2Si$ phase proceeded inside the plated layer, the $Mg_2Si$ phase did not crystallize on the surface, and planar corrosion resistance and end surface corrosion resistance were reduced.

TABLE 1

| | | Plated layer components (mass %) Remainder: Zn and impurities | | | | | | | | |
|---|---|---|---|---|---|---|---|---|---|---|
| | | | | | | | | | Other elements | |
| Category | No. | Zn | Al | Mg | Sn | Si | Ca | Ni | Fe | Type | Total (%) |
| Example | 1 | Balance | 10.0 | 3.0 | 0 | 0.01 | 0 | 0 | 0.05 | — | — |
| | 2 | Balance | 11 | 3.0 | 0.06 | 0.1 | 0 | 0 | 0.05 | Co | 0.006 |
| | 3 | Balance | 10.0 | 4.5 | 0 | 0.02 | 0.04 | 0 | 0.05 | Bi | 0.004 |
| | 4 | Balance | 10.0 | 5.0 | 0 | 0.06 | 0 | 0 | 0.08 | V | 0.008 |
| | 5 | Balance | 12 | 5.0 | 0 | 0.08 | 0 | 0 | 0.08 | Pb | 0.03 |
| | 6 | Balance | 12 | 5.0 | 0 | 0.08 | 0 | 0 | 0.08 | Pb | 0.03 |
| | 7 | Balance | 12 | 6.0 | 0 | 0.1 | 0 | 0 | 0.1 | Sr | 0.05 |
| | 8 | Balance | 12 | 6.0 | 0 | 0.1 | 0 | 0 | 0.08 | — | — |
| | 9 | Balance | 13 | 5.0 | 0 | 0.2 | 0 | 0 | 0.1. | Li | 0.02 |
| | 10 | Balance | 15 | 5.0 | 0.06 | 0.2 | 0 | 0 | 0.2 | Ag | 0.01 |
| | 11 | Balance | 17 | 5.0 | 0 | 0.2 | 0.04 | 0.001 | 0.2 | P | 0.01 |
| | 12 | Balance | 18 | 6.0 | 0 | 0.4 | 0.04 | 0 | 0.2 | Mn | 0.02 |
| | 13 | Balance | 19 | 6.0 | 0.2 | 0.6 | 0.04 | 0 | 0.1 | Sb | 0.08 |
| | 14 | Balance | 19 | 6.0 | 0.5 | 0.2 | 0.04 | 0 | 0.1 | — | — |
| | 15 | Balance | 19 | 6.0 | 0 | 0.2 | 0.04 | 0 | 0.1 | In | 0.02 |
| | 16 | Balance | 19 | 7.0 | 0 | 0.2 | 0.04 | 0 | 0.3 | — | — |
| | 17 | Balance | 20 | 10.0 | 0 | 0.2 | 0.05 | 0 | 0.1 | B | 0.01 |
| | 18 | Balance | 20 | 6.0 | 0 | 0.1 | 0.04 | 0 | 0.1 | Nb | 0.01 |
| | 19 | Balance | 20 | 3.0 | 0 | 0.2 | 0.04 | 0 | 0.3 | — | — |
| | 20 | Balance | 22 | 6.0 | 0 | 0.4 | 0.04 | 0 | 0.1 | La | 0.02 |
| | 21 | Balance | 22 | 8.0 | 0 | 0.7 | 0.04 | 0 | 0.2 | Ce | 0.02 |
| | 22 | Balance | 22 | 4.0 | 0 | 0.1 | 0.01 | 0 | 0.2 | Zr | 0.01 |
| | 23 | Balance | 24 | 3.0 | 0 | 0.1 | 0 | 0 | 0.3 | W | 0.02 |
| | 24 | Balance | 22 | 4.0 | 0 | 0.1 | 0.01 | 0.01 | 0.4 | Mo | 0.03 |
| | 25 | Balance | 22 | 4.0 | 0 | 0.1 | 0.01 | 0.0 | 0.4 | — | — |
| | 26 | Balance | 23 | 8.0 | 0 | 0.7 | 0.04 | 0 | 0.6 | Ti | 0.01 |
| | 27 | Balance | 23 | 8.0 | 0 | 0.7 | 0.04 | 0 | 0.6 | Ti | 0.0 |
| | 28 | Balance | 25.0 | 8.0 | 0 | 1.2 | 0.04 | 0 | 1.0 | Cu | 0.2 |
| | 29 | Balance | 24 | 7.0 | 0 | 1.6 | 0.04 | 0 | 1.4 | Y | 0.02 |
| | 30 | Balance | 25.0 | 8.0 | 0 | 2.0 | 0.04 | 0 | 1.3 | Cr | 0.05 |

TABLE 1-continued

| | | Plated layer components (mass %) Remainder: Zn and impurities | | | | | | | | Other elements | |
|---|---|---|---|---|---|---|---|---|---|---|---|
| Category | No. | Zn | Al | Mg | Sn | Si | Ca | Ni | Fe | Type | Total (%) |
| Comparative Example | 31 | Balance | 6.5 | 4 | 0 | 0 | 0 | 0 | 0.1 | — | — |
| | 32 | Balance | 27 | 7 | 0 | 0.1 | 0 | 0 | 0.1 | — | — |
| | 33 | Balance | 1.9 | 2.6 | 0 | 0.2 | 0.01 | 0 | 0.1 | — | — |
| | 34 | Balance | 19 | 11 | 0 | 0 | 0.05 | 0 | 0.1 | — | — |
| | 35 | Balance | 19 | 5 | 0 | 2.2 | 0.01 | 0 | 0.1 | — | — |
| | 36 | Balance | 20 | 5 | 0 | 0.2 | 0.07 | 0 | 0.1 | — | — |
| | 37 | Balance | 20 | 5 | 0 | 0.6 | 0.01 | 0 | 0.8 | — | — |
| | 38 | Balance | 20 | 5 | 0 | 0.6 | 0.01 | 0 | 0.8 | — | — |
| Example | 39 | Balance | 19 | 6.0 | 0 | 0.2 | 0.04 | 0 | 0.1 | — | — |

Underline means outside of the range of the present invention.

TABLE 2

| | | Manufacturing conditions | | | | | | | |
|---|---|---|---|---|---|---|---|---|---|
| Category | No. | Plated original sheet roughness Ra (μm) | $L_p/L_0$ (—) | Bath temperature (□) | Controlled cooling temperature (□) | Cooling gas flux from bath temperature to controlled cooling temperature (L/min/m²) | Cooling rate from bath temperature to controlled cooling temperature (□/sec) | Cooling gas flux from controlled cooling temperature to 300□ (L/min/m²) | Cooling rate from controlled cooling temperature to 300□ (□/sec) |
| Example | 1 | 1.1 | 2.0 | 460 | 380 | 5000 | 15 | 10000 | 10 |
| | 2 | 1.2 | 1.5 | 480 | 400 | 5000 | 15 | 10000 | 10 |
| | 3 | 2.1 | 1.6 | 500 | 420 | 5000 | 15 | 10000 | 10 |
| | 4 | 1.1 | 1.6 | 500 | 420 | 2500 | 15 | 10000 | 10 |
| | 5 | 1.6 | 1.6 | 530 | 450 | 2000 | 15 | 10000 | 10 |
| | 6 | 3.7 | 2.6 | 530 | 450 | 2000 | 15 | 10000 | 10 |
| | 7 | 1.8 | 1.5 | 530 | 450 | 1000 | 15 | 10000 | 10 |
| | 8 | 1.2 | 1.2 | 530 | 450 | 500 | 15 | 10000 | 10 |
| | 9 | 1.2 | 1.6 | 530 | 450 | 4000 | 15 | 10000 | 12 |
| | 10 | 1.1 | 1.6 | 530 | 450 | 4000 | 15 | 10000 | 12 |
| | 11 | 1 | 1.6 | 530 | 450 | 500 | 15 | 10000 | 12 |
| | 12 | 0.5 | 1.1 | 530 | 450 | 4000 | 15 | 10000 | 12 |
| | 13 | 1.1 | 1.2 | 530 | 450 | 4000 | 15 | 10000 | 12 |
| | 14 | 1.6 | 1.6 | 530 | 450 | 500 | 15 | 10000 | 12 |
| | 15 | 1.6 | 1.6 | 530 | 470 | 200 | 15 | 10000 | 12 |
| | 16 | 1.5 | 1.6 | 530 | 480 | 100 | 15 | 10000 | 12 |
| | 17 | 1.1 | 1.2 | 590 | 510 | 1000 | 15 | 10000 | 12 |
| | 18 | 1.5 | 1.6 | 540 | 460 | 500 | 15 | 10000 | 12 |
| | 19 | 1.7 | 1.6 | 540 | 460 | 1000 | 20 | 10000 | 14 |
| | 20 | 1.8 | 1.6 | 540 | 460 | 500 | 20 | 10000 | 14 |
| | 21 | 1.9 | 1.6 | 540 | 460 | 500 | 20 | 10000 | 14 |
| | 22 | 1.8 | 1.6 | 540 | 460 | 5000 | 20 | 10000 | 14 |
| | 23 | 1.7 | 1.6 | 560 | 480 | 5000 | 20 | 10000 | 14 |
| | 24 | 1.5 | 1.6 | 540 | 460 | 5000 | 20 | 10000 | 14 |
| | 25 | 1.7 | 1.6 | 540 | 460 | 5000 | 20 | 10000 | 14 |
| | 26 | 3.6 | 2.7 | 550 | 470 | 1000 | 20 | 10000 | 14 |
| | 27 | 1.8 | 1.6 | 550 | 470 | 1000 | 20 | 10000 | 14 |
| | 28 | 1.8 | 1.6 | 550 | 470 | 900 | 20 | 10000 | 14 |
| | 29 | 2.5 | 1.6 | 550 | 470 | 800 | 20 | 10000 | 14 |
| | 30 | 1.8 | 1.6 | 550 | 470 | 500 | 20 | 10000 | 14 |
| Comparative Example | 31 | 1.5 | 1.5 | 450 | 370 | 5000 | 15 | 10000 | 10 |
| | 32 | 1.7 | 1.7 | 600 | 520 | 5000 | 15 | 10000 | 10 |
| | 33 | 1.8 | 1.5 | 540 | 460 | 5000 | 15 | 10000 | 10 |
| | 34 | 1.7 | 1.4 | 540 | 460 | 5000 | 15 | 10000 | 10 |
| | 35 | 1.7 | 1.8 | 510 | 430 | 5000 | 15 | 10000 | 10 |
| | 36 | 1.6 | 1.3 | 540 | 460 | 5000 | 15 | 10000 | 10 |
| | 37 | 1.7 | 1.8 | 520 | 440 | 5500 | 15 | 10000 | 10 |
| | 38 | 1.7 | 1.6 | 520 | 440 | 5000 | 15 | 5000 | 10 |
| Example | 39 | 1.5 | 1.6 | 530 | 480 | 100 | 15 | 80000 | 12 |

Underline means outside of the range of the preferred manufacturing conditions.

TABLE 3

| Category | No. | Mg₂Si phase Number density (phases/(10000 μm²)) | Mg—Si—Zn—Al phase Number density (phases/(10000 μm²)) | Mg₂Sn phase Present or absent | Planar corrosion resistance | End surface corrosion resistance |
|---|---|---|---|---|---|---|
| Example | 1 | 3 | 0 | Absent | A | A |
| | 2 | 5 | 0 | Present | A | AA |
| | 3 | 11 | 3 | Absent | AA | A |
| | 4 | 15 | 10 | Absent | AA | AA |
| | 5 | 21 | 11 | Absent | AA | AA |
| | 6 | 14 | 0 | Absent | A | A |
| | 7 | 30 | 12 | Absent | AAA | AAA |
| | 8 | 67 | 19 | Absent | AAA | AAA |
| | 9 | 29 | 18 | Absent | AA | AA |
| | 10 | 28 | 11 | Present | AA | AAA |
| | 11 | 70 | 0 | Absent | AAA | AAA |
| | 12 | 28 | 24 | Absent | AA | AA |
| | 13 | 27 | 21 | Present | AA | AAA |
| | 14 | 66 | 17 | Present | AAA | AAA |
| | 15 | 67 | 19 | Absent | AAA | AAA |
| | 16 | 64 | 14 | Absent | AAA | AAA |
| | 17 | 25 | 65 | Absent | AA | AA |
| | 18 | 78 | 13 | Absent | AAA | AAA |
| | 19 | 29 | 9 | Absent | AA | AA |
| | 20 | 102 | 10 | Absent | AAA | AAA |
| | 21 | 122 | 18 | Absent | AAA | AAA |
| | 22 | 14 | 0 | Absent | A | A |
| | 23 | 13 | 1 | Absent | A | A |
| | 24 | 15 | 1 | Absent | A | A |
| | 25 | 14 | 1 | Absent | A | A |
| | 26 | 29 | 2 | Absent | AA | AA |
| | 27 | 99 | 28 | Absent | AAA | AAA |
| | 28 | 102 | 31 | Absent | AAA | AAA |
| | 29 | 125 | 80 | Absent | AA | AAA |
| | 30 | 150 | 100 | Absent | AA | AAA |
| Comparative Example | 31 | <u>1</u> | 0 | Absent | B | A |
| | 32 | <u>0</u> | 0 | Absent | AA | B |
| | 33 | <u>1</u> | 0 | Absent | B | B |
| | 34 | <u>0</u> | 0 | Absent | B | A |
| | 35 | <u>1</u> | 0 | Absent | B | B |
| | 36 | <u>0</u> | 0 | Absent | B | B |
| | 37 | <u>0</u> | 0 | Absent | B | B |
| | 38 | <u>0</u> | 0 | Absent | B | B |
| Example | 39 | 6<u>7</u> | 15 | Absent | AAA | AAA |

Underline means outside of the range of the present invention.

INDUSTRIAL APPLICABILITY

The plated steel sheet of the present disclosure is excellent in both planar corrosion resistance and coating adhesion and thus high in industrial applicability.

REFERENCE SIGNS LIST

1 Plated steel sheet
11 Steel sheet
12 Plated layer

The invention claimed is:

1. A plated steel sheet comprising:
a steel sheet, and a plated layer disposed on a surface of the steel sheet,
wherein the plated layer has a chemical composition containing, in mass %,
Al: 10.0 to 25.0 mass %,
Mg: 3.0 to 10.0 mass %,
Fe: 0.01 to 2.0 mass %, and
Si: more than 0 to 2.0 mass %, and
further optionally containing one or more of Group A, Group B, and Group C:

[Group A] Ni: 0 to 1.0 mass %,
[Group B] Ca: 0 to 0.05 mass %,
[Group C] is one or more of, in mass %, Sb: 0 to 0.5%, Pb: 0 to 0.5%, Cu: 0 to 1.0%, Sn: 0 to 1.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%; wherein a total content of Sb, Pb, Cu, Sn, Ti, Cr, Nb, Zr, Mn, Mo, Ag, Li, La, Ce, B, Y, P, Sr, Co, Bi, In, V, and W is 0 to 5 mass %,
with a remainder including Zn and impurities, and
a number density of Mg₂Si phases which (a) have a major axis of 2 μm or more, and (b) are exposed on the surface of the plated layer, is 3 to 150 per area of 10,000 μm².

2. The plated steel sheet according to claim 1, wherein Mg and Si in the chemical composition of the plated layer are Mg: 4.5 to 8 mass % and Si: 0.1 to 2.0 mass %, and the number density of Mg₂Si phases which (a) have a major axis of 2 μm or more, and (b) are exposed on the surface of the plated layer, is 15 to 150 per area of 10,000 μm².

3. The plated steel sheet according to claim 1, wherein

Al, Mg, and Si in the chemical composition of the plated layer are Al: 15 to 25.0 mass %, Mg: 4.5 to 8 mass %, and Si: 0.1 to 2.0 mass %, and the number density of $Mg_2Si$ phases which (a) have a major axis of 2 μm or more, and (b) are exposed on the surface of the plated layer, is 30 to 150 per area of 10,000 μm².

4. The plated steel sheet according to claim 1, wherein

Al, Mg, and Si in the chemical composition of the plated layer are Al: 15 to 25.0 mass %, Mg: 4.5 to 8 mass %, and Si: 0.1 to 2.0 mass %, and a number density of Mg—Si—Zn—Al phases which (a) have a major axis of 2 μm or more, and (b) are exposed on the surface of the plated layer, is 5 to 150 per area of 10,000 μm².

5. The plated steel sheet according to claim 4, wherein

Sn in the chemical composition of the plated layer is Sn: 0.05 to 0.5 mass %, and a $Mg_2Sn$ phase is detected in the plated layer in X-ray diffraction measurement for the plated layer.

6. The plated steel sheet according to claim 1, wherein

Sn in the chemical composition of the plated layer is Sn: 0.05 to 0.5 mass %, and a $Mg_2Sn$ phase is detected in the plated layer in X-ray diffraction measurement for the plated layer.

7. The plated steel sheet according to claim 1, wherein Group A is present in the chemical composition, and [Group A] Ni: 0.05 to 1.0 mass %.

8. The plated steel sheet according to claim 1, wherein Group B is present in the chemical composition, and [Group B] Ca: 0.005 to 0.05 mass %.

9. The plated steel sheet according to claim 1, wherein Group C is present in the chemical composition, and [Group C] is one or more of, in mass %, Sb: 0 to 0.5%, Pb: 0 to 0.5%, Cu: 0 to 1.0%, Sn: 0 to 1.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%; wherein a total content of Sb, Pb, Cu, Sn, Ti, Cr, Nb, Zr, Mn, Mo, Ag, Li, La, Ce, B, Y, P, Sr, Co, Bi, In, V, and W is 0.008 to 0.05 mass %.

* * * * *